S. M. VAUCLAIN.
CAR TRUCK.
APPLICATION FILED DEC. 12, 1908.
975,303.
Patented Nov. 8, 1910.
3 SHEETS—SHEET 2.
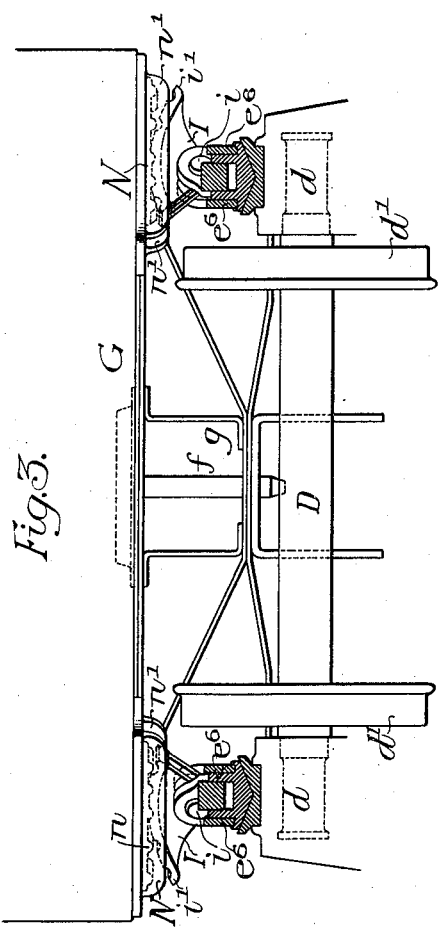
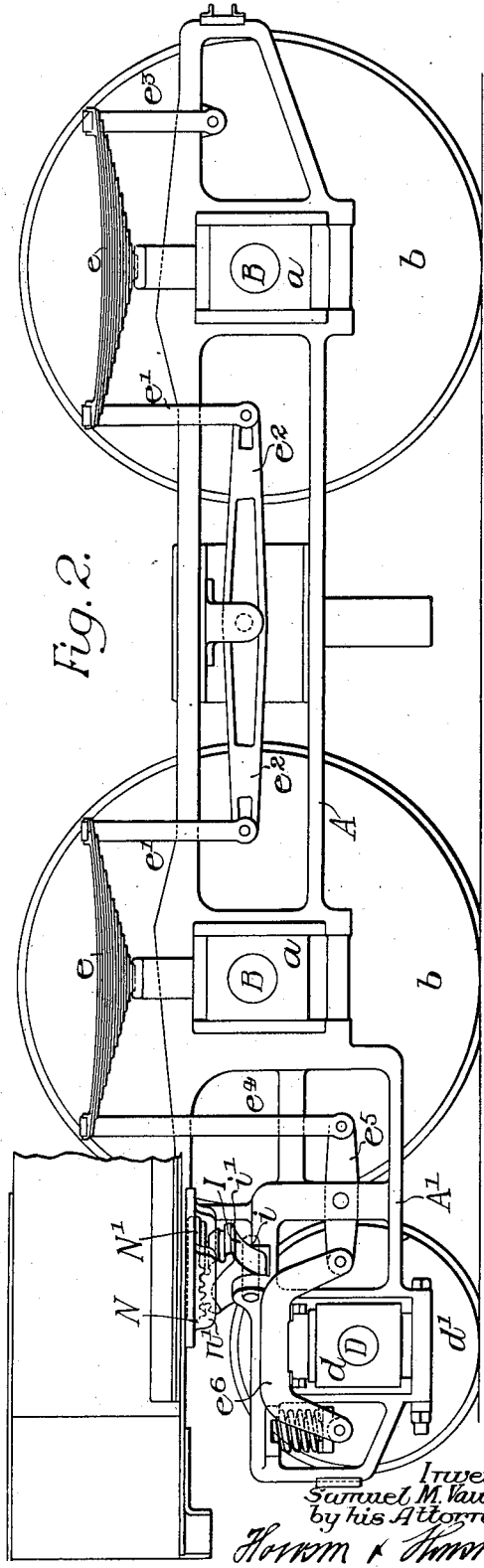
Witnesses—
Augustus B. Coppes
Villa A. Burrowes
Inventor.
Samuel M. Vauclain
by his Attorneys

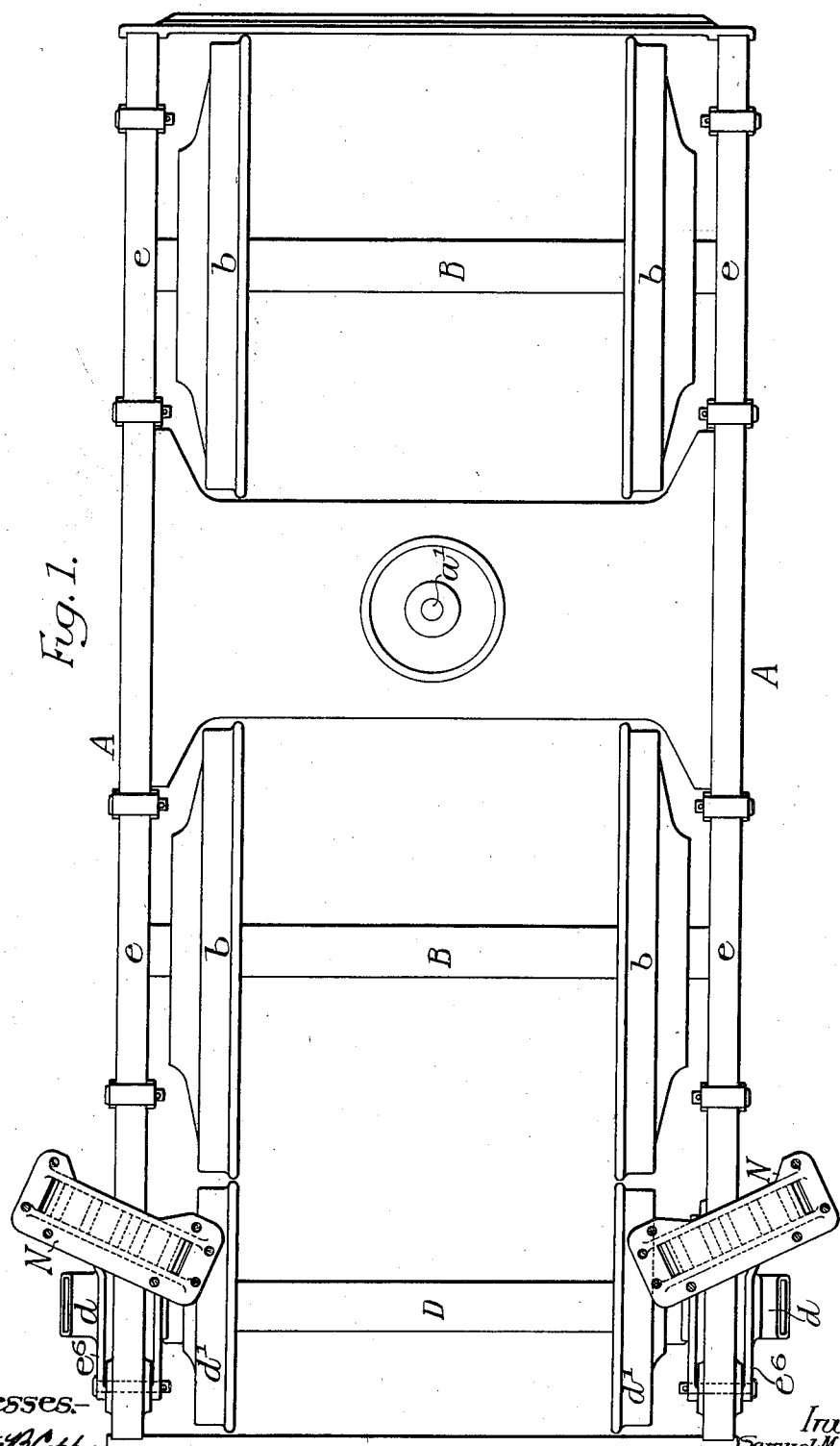

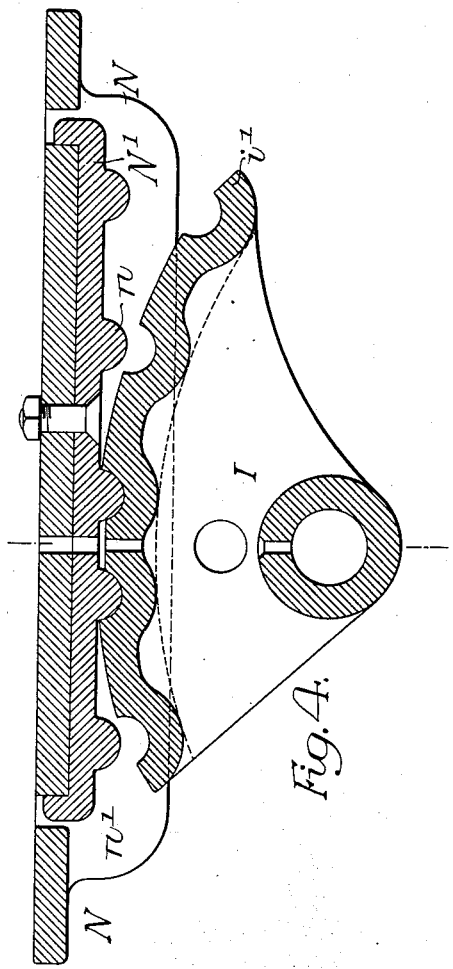
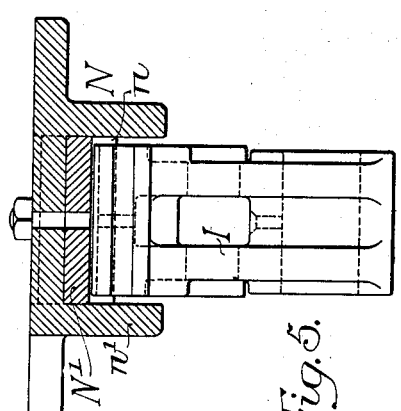
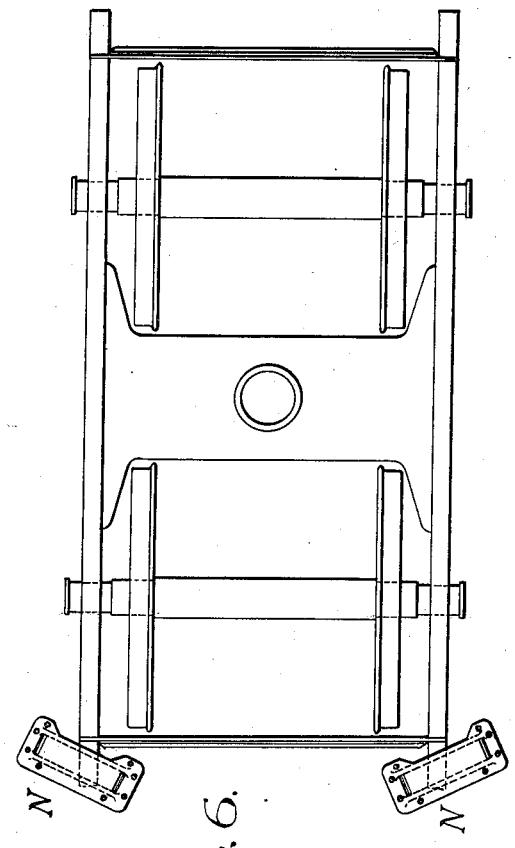

UNITED STATES PATENT OFFICE.

SAMUEL M. VAUCLAIN, OF PHILADELPHIA, PENNSYLVANIA, ASSIGNOR, BY MESNE ASSIGNMENTS, TO BALDWIN LOCOMOTIVE WORKS, OF PHILADELPHIA, PENNSYLVANIA, A CORPORATION OF PENNSYLVANIA.

CAR-TRUCK.

975,303.  Specification of Letters Patent.  Patented Nov. 8, 1910.

Application filed December 12, 1908. Serial No. 467,185.

*To all whom it may concern:*

Be it known that I, SAMUEL M. VAUCLAIN, a citizen of the United States, residing in Philadelphia, Pennsylvania, have invented certain Improvements in Car-Trucks, of which the following is a specification.

My invention relates to certain improvements in trucks, especially of the type used on electric railways in which the motor is carried by the trucks.

The ordinary four-wheel trucks used under electric cars are usually controlled by loose chains which prevent the trucks turning too far in the event of a derailment. When the cars attain a high speed the ordinary four-wheel truck will swing quite considerably and make the car travel hard.

The object of my invention is to so construct the truck that it will travel more easily, and to provide means for bringing the truck back to its normal central position. This object I attain in the following manner, reference being had to the accompanying drawings, in which:—Figure 1, is a plan view of my improved truck; Fig. 2, is a side view; Fig. 3, is a transverse sectional view; Figs. 4 and 5, are detached sectional views illustrating the segment and rack; and Fig. 6, is a view showing my invention applied to a four-wheel truck.

A is the frame of the truck having a pedestal for the reception of the box $a$, and B, B are two main axles having wheels $b$.

$a'$ is the center bearing on the truck frame.

$e$, $e$ are the springs supported by a box $a$ and connected by the links $e'$ to a pivoted beam $e^2$. A link $e^3$ connects one of the springs to the frame A and the other spring is connected by a link $e^4$ to a pivoted beam $e^5$, which is connected to an arm $e^6$ pivoted to a yielding support on the truck frame and rests upon the box $d$ adapted to pedestals in the extension $A'$ of the frame. The axle D is adapted to these boxes and has wheels $d'$ considerably less in diameter than the wheels $b$, $b$. The extension $A'$ is at one end only of the truck and carries the axle D and the wheels $d'$.

$f$ is a center pin which extends through the center bearing $g$ on the car body G and through the center bearing $a'$ of the truck, and the truck swings on this center pin in the usual manner.

In order to provide means to bring the truck back to its normal position I mount a toothed segment at each side of the extension $a'$ of the truck. This segment is pivoted to the truck at $i$ and is eccentric as shown in Fig. 4. The teeth $i'$ of the segment mesh with teeth $n$ on a rack $N'$ detachably secured to a plate N attached to the underside of the car body and this plate has flanges $n'$ at each side for guiding the segment I, so that as the truck swings to one side or the other the segments will rock and as it is eccentric the pressure will be increased as the truck moves away from the center toward either side, therefore the tendency of the pressure is at all times to bring the truck back to its central normal position. Thus the bearing of the car body on the truck is at three points, one point being at or near the center of the main body of the truck and the other two points being approximately above the two small wheels at the end of the truck. In some instances the racks may be mounted on the truck frame and the segments I may be pivoted to bearings on the car body, without departing from the main features of my invention.

It will be seen that by the above invention I obtain a three point support and lighten the weight on the main drivers considerably, making the truck ride much easier than heretofore, and the two side supports being eccentric the car body is lifted when the truck moves from one extreme position to the other and the weight of the car body is utilized in returning the truck to its normal central position.

My invention can be applied to a four wheel truck, as illustrated in Fig. 6, without departing from the invention, although the six wheel truck is preferred. In the four wheel truck the center bearing is at the same point, but the side bearing segments will be mounted directly above one corner of the truck as indicated, giving the three-point support.

I claim:—

1. The combination in a car truck having four or more wheels, two main axles and wheels, a center bearing located between the two main axles, and two side bearings located at one end of the truck and approximately over two of the wheels, each side bearing consisting of a pivoted toothed segment and rack.

2. The combination in a car truck, of a frame, axles, wheels mounted on the axles, a pivot for the car truck mounted between two of the axles, a car body mounted on the truck, two side bearings located at one end of the truck approximately over two of the wheels, each side bearing consisting of a toothed segment and rack, one element mounted on the car body and the other element mounted on the truck.

3. The combination in a car truck, of a frame, axles and wheels, a pivot for the truck, a car body mounted on the truck, two side bearings approximately over two of the wheels of the truck, each side bearing consisting of a toothed segment and a rack, and a pivot on the truck frame for the segment, the rack being secured to the underside of the car body.

4. The combination in a car truck having a frame, axles and wheels, of a car body to which the truck is pivoted, side bearings approximately over two of the wheels of the truck and each side bearing consisting of an eccentric segment having a series of teeth and a toothed rack, one element being mounted on the frame of the truck and the other element secured to the underside of the car body.

5. The combination of a car body, a truck having a frame, two main axles provided with wheels, the center bearing and pivot for the car truck being about mid-way between the two main axles, a supplemental axle at one end of the truck and having wheels thereon, and two side bearings approximately above the supplemental wheels, each side bearing consisting of a rack and toothed segment.

6. The combination of a car body, a truck mounted therein and having a frame with two main axles and wheels mounted on the axles, a center bearing on the truck about mid-way between the two main axles, a pivot pin connecting the center bearing of the truck with the body of the car, said truck frame having an extension at one end, an axle and wheels less in diameter than the main truck wheels, side bearings mounted approximately above the said small wheels, each consisting of an eccentric toothed segment and a rack, the segments being mounted on the extension of the truck frame, and the rack being mounted on the car body.

In testimony whereof, I have signed my name to this specification, in the presence of two subscribing witnesses.

SAMUEL M. VAUCLAIN.

Witnesses:
 J. H. KERST,
 JOSEPH T. HUNT.